United States Patent
Chen et al.

(10) Patent No.: US 10,623,320 B2
(45) Date of Patent: Apr. 14, 2020

(54) LOAD SHARING METHOD, APPARATUS, AND SYSTEM

(71) Applicant: HUAWEI TECHNOLOGIES CO., LTD., Shenzhen (CN)

(72) Inventors: Liang Chen, Beijing (CN); Peng Zhang, Beijing (CN); Dongchen Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 15/954,616

(22) Filed: Apr. 17, 2018

(65) Prior Publication Data
US 2018/0234344 A1    Aug. 16, 2018

Related U.S. Application Data

(63) Continuation of application No. PCT/CN2016/099892, filed on Sep. 23, 2016.

(30) Foreign Application Priority Data

Oct. 28, 2015    (CN) .......................... 2015 1 0712755

(51) Int. Cl.
*H04L 12/803*    (2013.01)
*H04L 29/08*    (2006.01)
(Continued)

(52) U.S. Cl.
CPC ........ *H04L 47/125* (2013.01); *H04L 12/4625* (2013.01); *H04L 29/08* (2013.01);
(Continued)

(58) Field of Classification Search
None
See application file for complete search history.

(56) References Cited

U.S. PATENT DOCUMENTS 7,984,141 B2 *    7/2011   Gupta ................. H04L 12/2856
                                                                370/229
8,224,961 B1      7/2012   Zielinski et al.
(Continued)

FOREIGN PATENT DOCUMENTS

CN    101076978 A    11/2007
CN    101087232 A    12/2007
(Continued)

*Primary Examiner* — Jamal Javaid
(74) *Attorney, Agent, or Firm* — Kilpatrick Townsend & Stockton LLP

(57) ABSTRACT

Embodiments of the present application disclose a load sharing method, apparatus, and system. The method includes: obtaining, by a controller, a load parameter of a target network device; determining, by the controller according to the load parameter, whether the target network device is in an overloaded state; and sending, by the controller, first configuration information to the target network device when the target network device is in the overloaded state, where the target network device is configured to be in a first state according to the first configuration information, and the first state instructs the target network device to delay or skip returning a PADO packet when receiving a PADI packet. According to the embodiments of the present application, not only load of network devices in a network is more balanced, but also a difficulty in implementing network load balance is small and costs are low.

20 Claims, 8 Drawing Sheets

(51) Int. Cl.
  *H04L 12/46*     (2006.01)
  *H04L 12/801*    (2013.01)
  *H04L 12/28*     (2006.01)
(52) U.S. Cl.
  CPC .......... *H04L 47/11* (2013.01); *H04L 67/1008* (2013.01); *H04L 67/1029* (2013.01); *H04L 12/2856* (2013.01); *H04L 67/1036* (2013.01)

(56) References Cited

U.S. PATENT DOCUMENTS

| | | |
|---|---|---|
| 2007/0263538 A1 | 11/2007 | Hueck et al. |
| 2009/0023455 A1 | 1/2009 | Gupta et al. |
| 2010/0325295 A1 | 12/2010 | Kajiwara et al. |
| 2015/0295834 A1 | 10/2015 | Layman et al. |
| 2016/0140012 A1* | 5/2016 | Hsu .................... G06F 11/3433 702/186 |

FOREIGN PATENT DOCUMENTS

| | | |
|---|---|---|
| CN | 102143027 A | 8/2011 |
| CN | 102404794 A | 4/2012 |
| CN | 104009862 A | 8/2014 |
| CN | 104102693 A | 10/2014 |
| CN | 104283804 A | 1/2015 |
| CN | 104301247 A | 1/2015 |
| CN | 104580012 A | 4/2015 |
| CN | 104836746 A | 8/2015 |
| CN | 105262696 A | 1/2016 |
| EP | 3094043 A1 | 11/2016 |
| WO | 2015127852 A1 | 9/2015 |

* cited by examiner

LOAD SHARING METHOD, APPARATUS, AND SYSTEM

CROSS-REFERENCE TO RELATED APPLICATIONS

This application is a continuation of International Application No. PCT/CN2016/099892, filed on Sep. 23, 2016, which claims priority to Chinese Patent Application No. 201510712755.9, filed on Oct. 28, 2015. The disclosures of the aforementioned applications are hereby incorporated by reference in their entireties.

TECHNICAL FIELD

The present application relates to the field of communications technologies, and in particular, to a load sharing method, apparatus, and system.

BACKGROUND

In a network, communication between endpoint devices may be implemented by using the Point-to-Point Protocol (PPP for short). When two endpoint devices need to communicate, a PPP session may be established first, and then data communication is performed based on the PPP session. In a network access technology, multiple user equipments and multiple network devices that are configured to connect the user equipments are distributed in a same network. When user equipment needs to access the network, the user equipment may select a network device in the network and establish a PPP session with the network device. Based on the PPP session, the user equipment and the network device may perform negotiation and data transmission, so that the user equipment can access the network by using the network device.

The inventor finds through research that in the prior art, a large quantity of user equipments in the network concentrate on some network devices to perform network access, and some other network devices are used for access of only a small quantity of user equipments. Therefore, in the network, usually load of some network devices is excessively heavy whereas load of some other network devices is idle, thereby causing load imbalance between the network devices in the network.

SUMMARY

A technical problem to be resolved in embodiments of the present application is to provide a load sharing method, apparatus, and system, so as to resolve a prior-art technical problem that load of network devices in a network is unbalanced.

According to a first aspect, an embodiment of the present application provides a load sharing method, where the method includes:

obtaining, by a controller, a load parameter of a target network device;

determining, by the controller according to the load parameter, whether the target network device is in an overloaded state; and sending, by the controller, first configuration information to the target network device when the target network device is in the overloaded state, where the target network device is configured to be in a first state according to the first configuration information, and the first state instructs the target network device to delay or skip returning a PADO packet when receiving a PADI packet.

In some embodiments, the obtaining, by a controller, a load parameter of a target network device includes:

sending, by the controller, a load parameter request to the target network device; and receiving, by the controller, the load parameter returned by the target network device for the load parameter request.

In some embodiments, the load parameter request is an extended multipart Multipart request message of the Openflow Openflow protocol, and the load parameter is sent by using an extended multipart response message of the Openflow protocol.

In some embodiments, the multipart request message includes a type Type field and a request body Body field, the type field carries a type value that indicates load balance information, and the request body field is empty or carries a device identifier.

Correspondingly, the multipart response message includes the type field and a response body Body field, and the response body field carries the load parameter of the target network device.

In some embodiments, the obtaining, by a controller, a load parameter of a target network device is specifically:

receiving the load parameter actively sent by the target network device.

In some embodiments, the determining, by the controller according to the load parameter, whether the target network device is in an overloaded state includes:

searching for, by the controller, a minimum value of load parameters of at least two network devices and using the minimum value as a minimum load value, where the at least two network devices include the target network device;

calculating, by the controller, a difference between the load parameter and the minimum load value and using the difference as a load difference;

determining, by the controller, whether the load difference exceeds a preset load threshold;

determining, by the controller when the load difference exceeds the load threshold, that the target network device is in the overloaded state; and determining, by the controller when the load difference does not exceed the load threshold, that the target network device is not in the overloaded state.

In some embodiments, the method further includes:

sending, by the controller, second configuration information to the target network device when the target network device is not in the overloaded state, where target network device is configured to be in a second state using the second configuration information, and the second state instructs the target network device to immediately return the PADO packet when receiving the PADI packet.

In some embodiments, the method further includes:

recording, by the controller after sending the first configuration information to the target network device, the target network device as an overloaded device; and deleting, by the controller after sending the second configuration information to the target network device, a record indicating that the target network device is the overloaded device.

In some embodiments, the method further includes:

determining, by the controller, whether the target network device is the recorded overloaded device, where the sending, by the controller, first configuration information to the target network device when the target network device is in the overloaded state is specifically: sending, by the controller, the first configuration information to the target network device when the target network device is in the overloaded state and the target network device is not the recorded overloaded device; and the sending, by the controller, second configuration information to the target network device when the target network device is not in the overloaded state is specifically: sending, by the controller, the second configuration information to the target network device when the target network device is not in the overloaded state and the target network device is the recorded overloaded device.

In some embodiments, the load parameter includes a user proportion, bandwidth utilization, CPU utilization, or a remaining CPU processing capability of the target network device.

In some embodiments, the target network device is a BNG

According to a second aspect, an embodiment of the present application provides another load sharing method, where the method includes:

receiving, by a target network device, first configuration information sent by a controller; and configuring, by the target network device, a first state according to the first configuration information, where the first state instructs the target network device to delay or skip returning a PADO packet when receiving a PADI packet; and the first configuration information is sent by the controller to the target network device when the controller determines, according to a load parameter of the target network device, that the target network device is in an overloaded state.

In some embodiments, the method further includes:
receiving, by the target network device, the PADI packet sent by user equipment; and delaying or skipping returning, by the target network device, the PADO packet to the user equipment when the target network device is in the first state.

In some embodiments, the method further includes:
receiving, by the target network device, a load parameter request sent by the controller; and returning, by the target network device, the load parameter to the controller.

In some embodiments, the load parameter request is an extended multipart request message of the Openflow protocol, and the load parameter is sent by using an extended multipart response message of the Openflow protocol.

In some embodiments, the multipart request message includes a type Type field and a request body Body field, the type field carries a type value that indicates load balance information, and the request body field is empty or carries a device identifier.

Correspondingly, the multipart response message includes the type field and a response body Body field, and the response body field carries the load parameter of the target network device.

In some embodiments, the method further includes:
actively sending, by the target network device, the load parameter to the controller.

In some embodiments, the method further includes:
receiving, by the target network device, second configuration information sent by the controller; and configuring, by the target network device, a second state according to the second configuration information, where the second state instructs the target network device to immediately return the PADO packet when receiving the PADI packet; and the second configuration information is sent by the controller to the target network device when the controller determines, according to the load parameter of the target network device, that the target network device is not in the overloaded state.

According to a third aspect, an embodiment of the present application provides a load sharing apparatus, where the apparatus includes:

an obtaining module, configured to obtain a load parameter of a target network device;

a first determining module, configured to determine, according to the load parameter, whether the target network device is in an overloaded state; and a first sending module, configured to send first configuration information to the target network device when the target network device is in the overloaded state, where the target network device is configured to be in a first state according to the first configuration information, and the first state instructs the target network device to delay or skip returning a PADO packet when receiving a PADI packet.

In some embodiments, the obtaining module includes:
a sending submodule, configured to send a load parameter request to the target network device; and a receiving submodule, configured to receive the load parameter returned by the target network device for the load parameter request.

In some embodiments, the load parameter request is an extended multipart Multipart request message of the Openflow Openflow protocol, and the load parameter is sent by using an extended multipart response message of the Openflow protocol.

In some embodiments, the multipart request message includes a type Type field and a request body Body field, the type field carries a type value that indicates load balance information, and the request body field is empty or carries a device identifier.

Correspondingly, the multipart response message includes the type field and a response body Body field, and the response body field carries the load parameter of the target network device.

In some embodiments, the obtaining module is specifically configured to receive the load parameter actively sent by the target network device.

In some embodiments, the first determining module includes:

a searching submodule, configured to search for a minimum value of load parameters of at least two network devices and use the minimum value as a minimum load value, where the at least two network devices include the target network device;

a calculation submodule, configured to calculate a difference between the load parameter and the minimum load value and use the difference as a load difference;

a first determining submodule, configured to determine whether the load difference exceeds a preset load threshold;

a second determining submodule, configured to determine, when the load difference exceeds the load threshold, that the target network device is in the overloaded state; and a third determining submodule, configured to determine, when the load difference does not exceed the load threshold, that the target network device is not in the overloaded state.

In some embodiments, the apparatus further includes:
a second sending module, configured to send second configuration information to the target network device when the target network device is not in the overloaded state, where target network device is configured to be in a second state using the second configuration information, and the second state instructs the target network device to immediately return the PADO packet when receiving the PADI packet.

In some embodiments, the apparatus further includes:

a recording module, configured to record the target network device as an overloaded device after the first configuration information is sent to the target network device; and a deletion module, configured to delete, after the second configuration information is sent to the target network device, a record indicating that the target network device is the overloaded device.

In some embodiments, the apparatus further includes:

a second determining module, configured to determine whether the target network device is the recorded overloaded device, where the first sending module is specifically configured to send the first configuration information to the target network device when the target network device is in the overloaded state and the target network device is not the recorded overloaded device; and the second sending module is specifically configured to send the second configuration information to the target network device when the target network device is not in the overloaded state and the target network device is the recorded overloaded device.

In some embodiments, the load parameter includes a user proportion, bandwidth utilization, CPU utilization, or a remaining CPU processing capability of the target network device.

In some embodiments, the target network device is a BNG

According to a fourth aspect, an embodiment of the present application provides another load sharing apparatus, where the apparatus includes:

a first receiving module, configured to receive first configuration information sent by a controller; and a first configuration module, configured to configure a first state according to the first configuration information, where the first state instructs a target network device to delay or skip returning a PADO packet when receiving a PADI packet; and the first configuration information is sent by the controller to the target network device when the controller determines, according to a load parameter of the target network device, that the target network device is in an overloaded state.

In some embodiments, the apparatus further includes:

a second receiving module, configured to receive the PADI packet sent by a host; and a returning control module, configured to delay or skip returning the PADO packet to the host when the returning control module is in the first state.

In some embodiments, the apparatus further includes:

a third receiving module, configured to receive a load parameter request sent by the controller; and a returning module, configured to return the load parameter to the controller.

In some embodiments, the load parameter request is an extended multipart request message of the Openflow protocol, and the load parameter is sent by using an extended multipart response message of the Openflow protocol.

In some embodiments, the multipart request message includes a type Type field and a request body Body field, the type field carries a type value that indicates load balance information, and the request body field is empty or carries a device identifier.

Correspondingly, the multipart response message includes the type field and a response body Body field, and the response body field carries the load parameter of the target network device.

In some embodiments, the apparatus further includes:

a sending module, configured to actively send the load parameter to the controller.

In some embodiments, the apparatus further includes:

a fourth receiving module, configured to receive second configuration information sent by the controller; and a second configuration module, configured to configure a second state according to the second configuration information, where the second state instructs the target network device to immediately return the PADO packet when receiving the PADI packet; and the second configuration information is sent by the controller to the target network device when the controller determines, according to the load parameter of the target network device, that the target network device is not in the overloaded state.

According to a fifth aspect, an embodiment of the present application provides a load sharing system, where the system includes a controller and a network device, the controller is equipped with the apparatus of any implementation in the third aspect, and the network device is equipped with the apparatus of any implementation in the fourth aspect.

Compared with the prior art, the embodiments of the present application have at least the following advantages:

According to the technical solutions in the embodiments of the present application, a target network device is used to represent any network device that requires load control in a network. A controller obtains a load parameter of the target network device, and determines, according to the load parameter, whether the target network device is in an overloaded state. The controller sends first configuration information to the target network device if the target network device is in the overloaded state. The target network device configures a first state when receiving the first configuration information. When the target network device is in the first state, the target network device delays or skips returning a PPPoE Active Discovery Offer Initiation (PADO for short) packet when receiving a PPPoE Active Discovery Initiation (PADI for short) packet. It can be learned that in the network, a network device with excessively heavy load is configured to be in the first state. When the PADI packet sent by user equipment is received, the network device with excessively heavy load does not immediately return the PADO packet to the user equipment, and a network device with idle load may return the PADO packet to the user equipment earlier than the network device with excessively heavy load. Therefore, when the user equipment requests to establish a PPP session with a network device that returns the PADO packet earliest, the user equipment may establish the PPP session with the network device with idle load. In this way, the user equipment selects the network device with idle load to access the network, and the user equipment is prevented from selecting the network device with excessively heavy load to access the network, so that load of network devices in the network is more balanced.

In addition, according to the technical solutions in the embodiments of the present application, the controller may implement load control on the network device by delivering, to the network device, the first configuration information that is used to configure the first state. Load balance between the network devices in the network is implemented in this manner, the load control on the network device may not need to rely on additionally adding, between the user equipment and the network device, a switching device that is configured to control a packet forwarding path, so that the load balance can be implemented without a need of transforming a network architecture. In addition, a packet forwarding path control command may not need to be preconfigured on the user equipment for the load control on the network device, so that the load balance can be implemented without a need of technically transforming a large quantity of user equipments. It can be learned that according to the technical solutions of the embodiments of the present application, a difficulty in implementing network load balance is small and costs are low so that the network load balance is more easily implemented.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments recorded in this application, and a person of ordinary skill in the art may still derive other drawings from these accompanying drawings.

DESCRIPTION OF EMBODIMENTS

Figure 1:
FIG. 1 is a schematic diagram of a framework of a network system in an application scenario according to an embodiment of the present application.

To make a person skilled in the art understand the technical solutions in the present application better, the following clearly describes the technical solutions in the embodiments of the present application with reference to the accompanying drawings in the embodiments of the present application. Apparently, the described embodiments are merely some rather than all of the embodiments of the present application.

The inventor finds through research that in the prior art, a process in which user equipment accesses a network to perform network access includes two stages, that is, a discovery stage and a session stage. In the discovery stage: When the user equipment needs to access the network, the user equipment may send a PADI packet to all network devices in the network, and the PADI packet is used to request a service of a specific type from the network device. After receiving the PADI packet, each network device may determine whether the network device can provide the service requested by the PADI packet. If the network device can provide the service requested by the PADI packet, a PADO packet may be returned to the user equipment. After sending the PADI packet, the user equipment generally receives PADO packets returned by multiple network devices. The user equipment chooses to request to establish a PPP session with a network device that returns the PADO packet earliest, and the network device provides a session identifier (Session ID) to the user equipment. In this way, the PPP session is established between the user equipment and the network device. In the session stage: The user equipment and the network device may implement the PPP session based on the session identifier. The user equipment and the network device may perform negotiation and data transmission based on the PPP session, so that the user equipment can access the network. It can be learned that, because the user equipment chooses to request to establish the PPP session with the network device that returns the PADO packet earliest, some network devices in the network need to carry a large quantity of user equipments to perform the PPP session, and load exceeds a threshold, whereas some other network devices in the network need to carry PPP sessions of only a small quantity of user equipments, and idle load is caused. Consequently, in the prior art, load of the network devices in the network is unbalanced.

In an embodiment of the present application, to ensure that the load of the network devices in the network is more balanced, a load sharing method and device are provided. A network device with excessively heavy load does not immediately return the PADO packet for the received PADI packet, and a network device with idle load may return the PADO packet to the user equipment earlier than the network device with excessively heavy load. Therefore, the user equipment may access the network by using the network device with idle load rather than the network device with excessively heavy load, and the load of the network devices in the network is more balanced.

Referring to FIG. 1, one application scenario of an embodiment of the present application may be applied to a network system including a controller 101 and a target network device 102. In the network system, the controller 101 obtains a load parameter of the target network device 102, and determines, according to the load parameter, whether the target network device 102 is in an overloaded state. The controller 101 sends first configuration information to the target network device 102 if the target network device 102 is in the overloaded state. The target network device 102 receives the first configuration information sent by the controller 101 and configures a first state according to the first configuration information. The first state instructs the target network device 102 to delay or skip returning a PADO packet when receiving a PADI packet. The target network device 102 may be any network device that is configured to connect user equipment and that is in the network system.

It should be noted that the foregoing application scenario is shown merely for ease of understanding a principle of this embodiment of the present application, and this embodiment of the present application is not limited thereto. Instead, this embodiment of the present application may be applied to any applicable scenario.

The following describes in detail implementations of the load sharing method, apparatus, and system in the present application with reference to accompanying drawings and by using specific embodiments.

Figure 2:
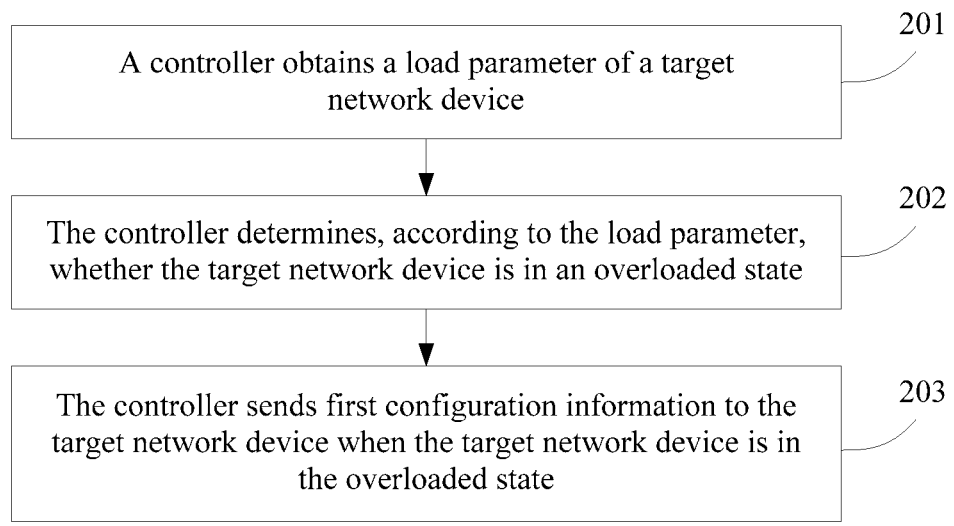
FIG. 2 is a flowchart of an embodiment of a load sharing method according to the present application.

Referring to FIG. 2, FIG. 2 is a flowchart of an embodiment of a load sharing method according to the present application. In this embodiment, for example, the method may specifically include the following steps.

Step 201: A controller obtains a load parameter of a target network device.

When the controller performs load control on the target network device, the controller obtains the load parameter of the target network device. The target network device may be any network device that is configured to connect user equipment and that is under control of the controller. For example, the target network device may be a switching device that is corresponding to any port and that is under control of the controller. For another example, the target network device may be a switching device that is corresponding to any slot and that is under control of the controller. The load parameter is a parameter that is used to describe a load status of the target network device. For example, the load parameter may be user utilization, bandwidth utilization, CPU utilization, or a remaining CPU processing capability. The user utilization of the target network device is a percentage of a quantity of connected user equipments on the target network device in a quantity of all user equipments. The bandwidth utilization of the target network device is a percentage of occupied bandwidth on the target network device in total bandwidth. The CPU utilization of the target network device is a percentage of an occupied CPU processing capability on the target network device in a total CPU processing capability. The remaining CPU processing capability of the target network device may be calculated according to the total CPU processing capability and the CPU utilization of the target network device.

In a specific implementation, the controller may obtain the load parameter in multiple different manners.

For example, the controller may actively request the load parameter from the target network device, and the target network device returns the load parameter of the target network device when receiving a load parameter request. Specifically, step 201 includes: the controller sends the load parameter request to the target network device; and the controller receives the load parameter returned by the target network device for the load parameter request. An occasion for the controller to send the load parameter request to the target network device is not limited in this embodiment. For example, the controller may send the load parameter request to the target network device when the target network device is required. In this case, the controller performs load control on the target network device according to a load parameter currently returned by the target network device. Alternatively, the controller may periodically send the load parameter request to the target network device and save, in real time, a load parameter last returned by the target network device. In this case, the controller performs load control on the target network device according to the load parameter that is of the target network device and that is saved by the controller.

For another example, the target network device may actively send the load parameter to the controller. In this case, step 201 is specifically: the controller receives the load parameter actively sent by the target network device. An occasion for the target network device to send the load parameter to the controller is not limited in this embodiment. For example, the target network device may periodically and actively send the load parameter to the controller, and the controller saves, in real time, the load parameter last returned by the target network device. In this case, the controller performs load control on the target network device according to the load parameter that is of the target network device and that is saved by the controller.

In the foregoing two examples, the target network device and the controller may transmit the load parameter by using multiple different protocols, such as the Openflow protocol, the Network Configuration (Netconf for short) protocol, or the Simple Network Management Protocol (SNMP for short).

For example, in the Openflow protocol, the load parameter request sent by the controller to the target network device may be an extended multipart request message, and the load parameter sent by the target network device to the controller may be sent by using a multipart response message. Specifically, the extended multipart request message includes a type Type field and a request body Body field, the type field carries a type value that indicates load balance information, the request body field is empty or carries a device identifier, and the multipart request message is a load parameter request. Correspondingly, the extended multipart response message includes the type field and a response body Body field, the type field carries the type value that indicates the load balance information, the response body field carries the load parameter of the target network device, and the multipart response message is used to send the load parameter.

In a specific implementation, the multipart request message may use the following format:

```
struct ofc_multipart_request {
    struct ofp_header header;
    uint16_t type; /* One of the OFPMP_* constant.*/
    uint16_t flags; /* OFPMPF_REQ_* flags.*/
    uint8_t pad[4];
    uint8_t body [0]; /* Body of the request.*/
};
```

The multipart response message may use the following format:

```
struct ofc_multipart_reply {
    struct ofp_header header;
    uint16_t type; /* One of the OFPMP_* constant.*/
    uint16_t flags; /* OFPMPF_REPLY_* flags.*/
    uint8_t pad[4];
    uint8_t body [0]; /* Body of the reply.*/
};
```

In the multipart request message and the multipart response message, the type value that is located in the type field and that indicates the load balance information may be a newly defined type value. For example, the type value may be defined as 17, that is:

OFPMP_BRAS_LOADBALANCE_INFO=17

In the multipart request message, the request body field may use the following format:

```
/*       Body      for      ofc_multipart_request      of      type
OFPMP_BRAS_LOADBALANCE _INFO. */
        struct ofp_bras_loadbalance_info_req {
            uint32_t port_no; /* port numbering.*/
            uint8_t slot_id;
            uint8_t pad[3]; /* Align to 64 bit*/
        };
```

In a body field of the multipart request message that is sent to the target network device, a port_no field carries a port number of the target network device, and a slot_id field carries a slot identifier of the target network device.

In the multipart response message, the response body field may use the following format:

```
/* Body for reply of OFPMP_BRAS_LOADBALANCE_INFO request. */
struct_ofp_bras_loadbalance_info_reply {
    uint32_t bandwidth; /* bandwidth of port.*/
    uint32_t max_user_num; /* Total user num of slot.*/
    uint32_t CPU_capability; /* cpu capability of slot.*/
    uint32_t mem_size; /* memory of slot.*/
    uint8_t bandwidth_uni_ratio; /* bandwidth utilization ratio.*/
    uint8_t user_uti_ratio; /* user utilization ratio.*/
    uint8_t CPU_uti_ratio; /* CPU utilization ratio.*/
    uint8_t mem_uti_ratio; /* memory utilization ratio.*/
    uint8_t pad[4]; /* Align to 64 bit*/
};
```

In a body field of the multipart response message sent by the target network device, a bandwidth field carries bandwidth of a port in which the target network device is located, a max_user_num field carries a total quantity of users of a slot in which the target network device is located, a CPU_capability field carries a CPU processing capability of the slot in which the target network device is located, a mem_size field carries a memory of the slot in which the target network device is located, a bandwidth_uni_ratio field carries the bandwidth utilization of the target network device, a user_uti_ratio field carries the user utilization of the target network device, a CPU_uti_ratio field carries the CPU utilization of the target network device, and a mem_uti_ratio field carries memory utilization of the target network device. It may be understood that the multipart response message sent by the target network device to the controller may carry any one or more of the foregoing fields, that is, the target network device may send any one or more types of load parameters to the controller by using one multipart response message.

Step 202: The controller determines, according to the load parameter, whether the target network device is in an overloaded state.

When obtaining the load parameter of the target network device, the controller may determine the load status of the target network device according to a magnitude of the load parameter, and it may be determined, according to a determining result, whether the target network device is in the overloaded state.

In a specific implementation, the controller may determine the load status of the target network device in multiple different manners.

For example, the controller may compare the load parameter with a preset threshold, and determine, according to a comparison result, whether the target network device is in the overloaded state. Specifically, step 202 includes: the controller compares the load parameter of the target network device with a preset load threshold; when a comparison result is that the load parameter is greater than the load threshold, the controller determines that the target network device is in the overloaded state; when the comparison result is that the load parameter is less than the load threshold, the controller determines that the target network device is not in the overloaded state.

For another example, the controller generally controls multiple network devices. When the load status of the target network device needs to be determined, the controller may determine, according to a load relationship between the target network device and another network device, whether the target network device is in the overloaded state. Specifically, step 202 includes: the controller searches for a minimum value of load parameters of at least two network devices and uses the minimum value as a minimum load value; the controller calculates a difference between the load parameter and the minimum load value and uses the difference as a load difference; the controller determines whether the load difference exceeds a preset load threshold; the controller determines, when the load difference exceeds the load threshold, that the target network device is in the overloaded state; and the controller determines, when the load difference does not exceed the load threshold, that the target network device is not in the overloaded state. The at least two network devices include the target network device. It may be understood that the load status of the target network device is determined according to a magnitude relationship between the load difference and the load threshold, and load statuses of the target network device and the another network device can be comprehensively considered, thereby preventing an excessively large quantity of network devices that cannot connect the user equipment in the network. In addition, the at least two network devices include any two or more network devices that are under control of the controller. For example, the at least two network devices may include all network devices under control of the controller.

Step 203: The controller sends first configuration information to the target network device when the target network device is in the overloaded state.

The target network device is configured to be in a first state according to the first configuration information, and the first state instructs the target network device to delay or skip returning a PADO packet when receiving a PADI packet.

When the controller determines, according to the load parameter, that the target network device is in the overloaded state, the controller sends the first configuration information to the target network device, and the target network device configures the target network device to be in the first state when receiving the first configuration information. When the target network device receives a PADI packet of user equipment, the target network device determines whether the target network device is in the first state. If the target network device determines that the target network device is in the first state, the target network device delays returning a PADO packet to the user equipment or skips returning a PADO packet to the user equipment. Therefore, when the target network device is in the overloaded state, a PADO packet earliest received by the user equipment is usually not the PADO packet of the target network device, and the user equipment generally does not choose to establish a PPP session with the target network device. In this way, the user equipment may avoid accessing a network by using a target network device with excessively heavy load.

When the controller determines that the target network device is in the overloaded state, this embodiment provides two implementations for controlling load of the target network device.

In one implementation, the first configuration information is a delay policy delivered by the controller to the target network device, the first state indicates a state in which the target network device has configured the delay policy, and the delay policy is used to instruct the target network device to perform delay processing on the PADI packet. Specifically, when the target network device receives the delay policy delivered by the controller, the delay policy is configured on the target network device. Thereafter, when the target network device receives the PADI packet of the user equipment, according to the delay policy, the target network device saves the PADI packet and starts a timer to delay processing the PADI packet. When a delay time that is set by the timer ends, the target network device returns the PADO packet to the user equipment. It can be learned that when the target network device is in the overloaded state, the user equipment receives, before the target network device returns the PADO packet, a PADO packet returned by another network device with idle load. Therefore, the user equipment does not select the target network device with excessively heavy load to establish the PPP session, but selects the another network device with idle load to establish the PPP session.

In another implementation, the first configuration information is a blocking policy delivered by the controller to the target network device, the first state indicates a state in which the target network device has configured the blocking policy, and the blocking policy is used to instruct the target network device to perform discard processing on the PADI packet, that is, instruct the target network device not to return the PADO packet for the PADI packet. Specifically, when the target network device receives the blocking policy delivered by the controller, the blocking policy is configured on the target network device. Thereafter, when the target network device receives the PADI packet of the user equipment, the target network device discards processing on the PADI packet according to the blocking policy, that is, the target network device does not return the PADO packet to the user equipment. It can be learned that when the target network device is in the overloaded state, the user equipment does not receive the PADO packet returned by the target network device, and therefore, the user equipment does not select the target network device with excessively heavy load to establish the PPP session.

In an implementation, the target network device is sometimes in the overloaded state, sometimes in an idle load state, and the load status of the target network device usually changes between load over-limit and idle load. Therefore, when the target network device changes from the overloaded state to the idle load state, the target network device performs normal processing on the PADI packet, and no longer performs delay processing on the PADI packet and no longer discards processing on the PADI packet. In this case, this embodiment may further include: the controller sends second configuration information to the target network device when the target network device is not in the overloaded state, where target network device is configured to be in a second state using the second configuration information, and the second state instructs the target network device to immediately return the PADO packet when receiving the PADI packet. Specifically, for the target network device that has configured the delay policy or has configured the blocking policy, the second configuration information may be a cancel policy delivered by the controller to the target network device, the second state indicates a state in which the target network device has canceled the delay policy and the blocking policy, and the cancel policy is used to instruct the target network device to cancel configuration of the delay policy and the blocking policy. It may be understood that when the target network device cancels the delay policy and the blocking policy, the target network device performs normal processing on the PADI packet, that is, when the target network device receives the PADI packet, the target network device immediately returns the PADO packet.

In a specific implementation, the controller generally controls multiple network devices. The controller delivers different configuration information to different network devices according to different load statuses of the network devices, and the different network devices are in different configuration states. To enable the controller to identify a configuration state in which each network device is currently located, this embodiment may further include: the controller records, after sending the first configuration information to the target network device, the target network device as an overloaded device; and the controller deletes, after sending the second configuration information to the target network device, a record indicating that the target network device is the overloaded device. It may be understood that the controller may identify, by using the record of the overloaded device, a network device that is in the first state. When the controller identifies that the target network device is currently recorded as the overloaded device, the controller may determine that the target network device is currently in the first state, and may determine that the target network device has currently configured the delay policy or the blocking policy. When the controller identifies that the target network device is currently not recorded as the overloaded device, the controller may determine that the target network device is currently in the second state, and may determine that the target network device has currently configured neither the delay policy nor the blocking policy.

In a specific implementation, when the controller determines that the target network device is in the overloaded state, the target network device is sometimes in the first state, and in this case, the controller may not send the first configuration information to the target network device. Similarly, when the controller determines that the target network device is not in the overloaded state, the target network device is sometimes in the second state, and in this case, the controller does not send the second configuration information to the target network device. Specifically, this embodiment may further include: the controller determines whether the target network device is the recorded overloaded device; step 203 is specifically: the controller sends the first configuration information to the target network device when the target network device is in the overloaded state and the target network device is not the recorded overloaded device; and the foregoing step in which the controller sends second configuration information to the target network device when the target network device is not in the overloaded state is specifically: the controller sends the second configuration information to the target network device when the target network device is not in the overloaded state and the target network device is the recorded overloaded device. That the target network device is recorded as the overloaded device indicates that the target network device is in the first state, and that the target network device is not recorded as the overloaded device indicates that the target network device is in the second state. It may be understood that the controller sends the first configuration information to the target network device only when load of the target network device in the second state exceeds a limit, and sends the second configuration information to the target network device only when the load of the target network device in the first state is idle. It can be learned that an amount of configuration information that needs to be transmitted in the network is relatively small, and a processing burden of the controller and the network device for the configuration information is relatively light.

It should be noted that the target network device mentioned in this embodiment may be a Broadband Network Gateway (BNG for short) or an access concentrator. More specifically, the target network device may be a broadband remote access server (BRAS for short). In addition, the user equipment mentioned in this embodiment may be a host, or may be a mobile terminal, or the like, and this is not limited in this embodiment.

According to the technical solution of this embodiment, in a network, a controller configures a network device with excessively heavy load to be in a first state. When PADI packet sent by user equipment is received, after the network device with excessively heavy load is configured by the controller, the network device with excessively heavy load delays returning or refuses to return a PADO packet to the user equipment, instead of immediately returning the PADO packet to the user equipment. Therefore, a network device with idle load may return the PADO packet to the user equipment earlier than the network device with excessively heavy load. Therefore, when the user equipment requests to establish a PPP session with a network device that returns the PADO packet earliest, the user equipment may establish the PPP session with the network device with idle load. It can be learned that the user equipment can select the network device with idle load to access the network and can avoid selecting the network device with excessively heavy load to access the network. In this way, load of network devices in the network is more balanced.

In addition, in the technical solution of this embodiment, the controller may implement load control on the network device by delivering, to the network device, first configuration information that is used to configure the first state. Load balance between the network devices in the network is implemented in this manner, a switching device that is configured to control a packet forwarding path does not need to be additionally added between the user equipment and the network device, so that load balance is implemented without a need of transforming a network architecture. In addition, a packet forwarding path control command does not need to be preconfigured on the user equipment, so that the load balance is implemented without a need of transforming a large quantity of user equipments. It can be learned that according to the technical solution of this embodiment of the present application, a difficulty in implementing network load balance is small and costs are low so that the network load balance is more easily implemented.

Figure 3:
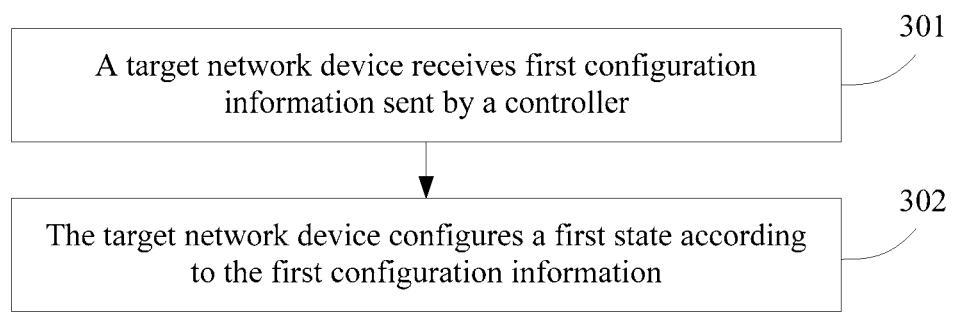
FIG. 3 is a flowchart of another embodiment of a load sharing method according to the present application.

Referring to FIG. 3, FIG. 3 is a flowchart of another embodiment of a load sharing method according to the present application. In this embodiment, for example, the method may specifically include the following steps:

Step 301: A target network device receives first configuration information sent by a controller.

Step 302: The target network device configures a first state according to the first configuration information.

The first state instructs the target network device to delay or skip returning a PADO packet when receiving a PADI packet.

The first configuration information is sent by the controller to the target network device when the controller determines, according to a load parameter of the target network device, that the target network device is in an overloaded state.

In some embodiments, this embodiment may further include:

the target network device receives the PADI packet sent by user equipment; and the target network device delays or skips returning the PADO packet to the user equipment when the target network device is in the first state.

In some embodiments, this embodiment may further include:

the target network device receives a load parameter request sent by the controller; and the target network device returns the load parameter to the controller.

In some embodiments, in this embodiment, the load parameter request may be an extended multipart request message of the Openflow protocol, and the load parameter may be sent by using an extended multipart response message of the Openflow protocol.

In some embodiments, the multipart request message may include a type Type field and a request body Body field, the type field carries a type value that indicates load balance information, and the request body field is empty or carries a device identifier.

Correspondingly, the multipart response message may include the type field and a response body Body field, and the response body field carries the load parameter of the target network device.

In some embodiments, this embodiment may further include:

the target network device actively sends the load parameter to the controller.

In some embodiments, this embodiment may further include:

the target network device receives second configuration information sent by the controller; and the target network device configures a second state according to the second configuration information.

The second state instructs the target network device to immediately return the PADO packet when receiving the PADI packet.

The second configuration information is sent by the controller to the target network device when the controller determines, according to the load parameter of the target network device, that the target network device is not in the overloaded state.

It should be noted that for content of the load parameter, the first configuration information, the second configuration information, the first state, and the second state in this embodiment of the present application, refer to the embodiment shown in FIG. 2. In addition, for various specific implementations in which the target network device performs method steps in this embodiment of the present application, refer to detailed descriptions of the embodiment shown in FIG. 2, and details are not described herein again.

According to the technical solution of this embodiment, in a network, a network device with excessively heavy load is configured to be in a first state by a controller. When PADI packet sent by user equipment is received, the network device with excessively heavy load delays returning or refuses to return a PADO packet to the user equipment, instead of immediately returning the PADO packet to the user equipment. Therefore, a network device with idle load may return the PADO packet to the user equipment earlier than the network device with excessively heavy load. Therefore, when the user equipment requests to establish a PPP session with a network device that returns the PADO packet earliest, the user equipment may establish the PPP session with the network device with idle load. It can be learned that the user equipment can select the network device with idle load to access the network and can avoid selecting the network device with excessively heavy load to access the network. In this way, load of network devices in the network is more balanced.

To enable a person skilled in the art to more clearly understand a specific application manner of the present application, the following describes this embodiment of the present application by using two example application scenarios.

In a first example application scenario, the first configuration information is a delay policy, the first state instructs the target network device to delay returning the PADO packet for the PADI packet, the second configuration information is a delay cancel policy, and the second state instructs the target network device to immediately return the PADO packet for the PADI packet. The controller performs load balance control on a first network device and a second network device, and the user equipment initiates the PADI packet to both the first network device and the second network device when the user equipment needs to access the network.

Figure 4A:
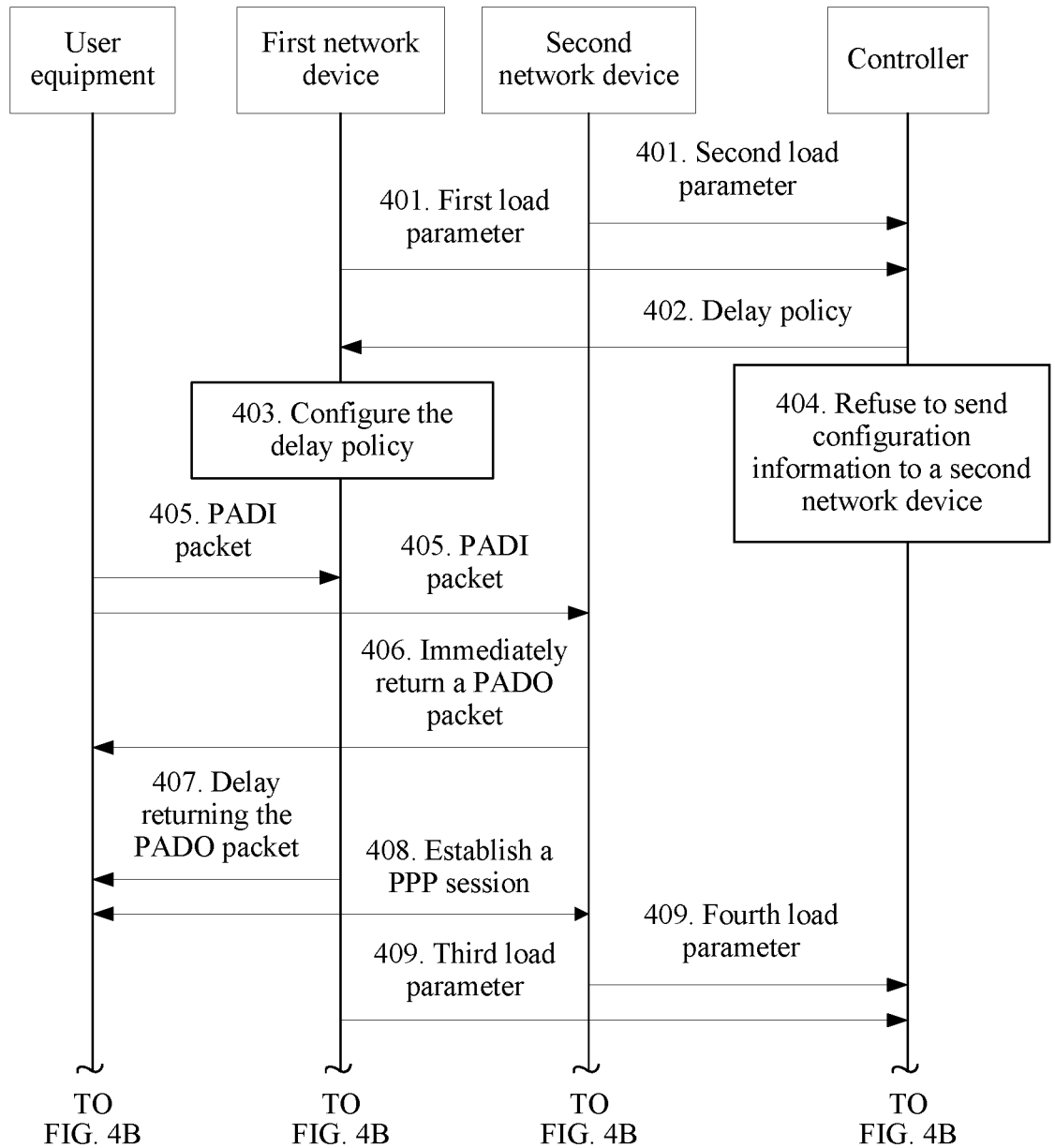
FIG. 4A and FIG. 4B are a flowchart of still another embodiment of a load sharing method according to the present application.
Figure 4B:
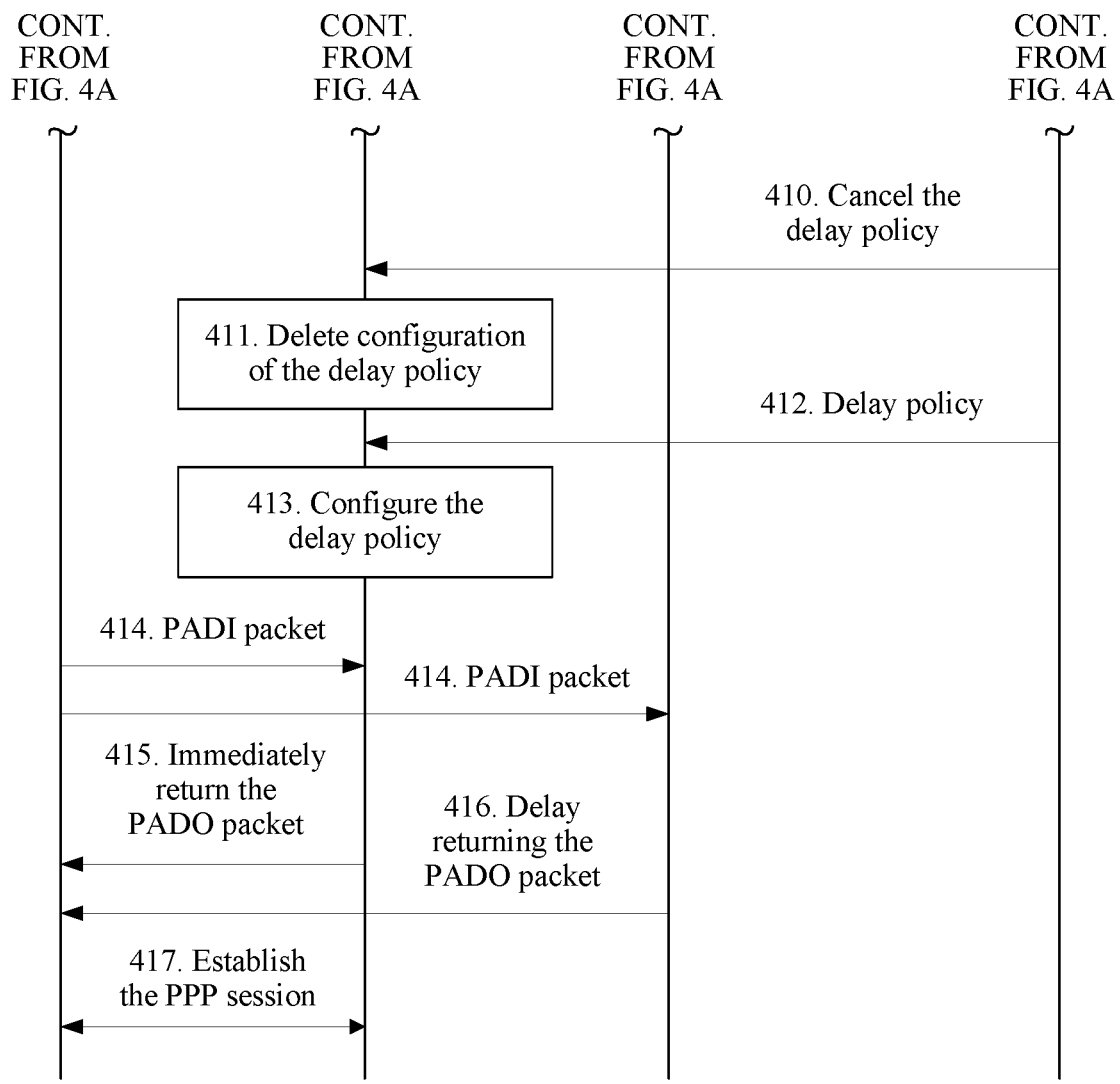

Referring to FIG. 4A and FIG. 4B, FIG. 4A and FIG. 4B are a flowchart of still another embodiment of a load sharing method according to an embodiment of the present application. This embodiment may be applied to the foregoing first example application scenario, and the method includes the following steps.

Step 401: A controller obtains a first load parameter of a first network device and a second load parameter of a second network device.

During specific implementation, the first network device sends a current load parameter of the first network device to the controller by using a multipart response message and uses the current load parameter of the first network device as the first load parameter, and the second network device sends a current load parameter of the second network device to the controller by using the multipart response message and uses the current load parameter of the second network device as the second load parameter.

Step 402: The controller determines, according to the first load parameter, that the first network device is in an overloaded state, determines, according to a record of an overloaded device, that the first network device is not recorded as the overloaded device, sends a delay policy to the first network device, and records the first network device as the overloaded device.

Step 403: The first network device configures the received delay policy.

Step 404: The controller determines, according to the second load parameter, that the second network device is not in the overloaded state, determines, according to the record of the overloaded device, that the second network device is not recorded as the overloaded device, and refuses to send configuration information to the second network device.

Step 405: User equipment separately sends a PADI packet to the first network device and the second network device.

Step 406: When receiving the PADI packet, the second network device immediately returns a PADO packet to the user equipment.

Step 407: When receiving the PADI packet, the first network device returns a PADO packet to the user equipment after delaying for a period of time according to the configured delay policy.

Step 408: The user equipment first receives the PADO packet returned by the second network device, and then receives the PADO packet returned by the first network device, and the user equipment and the second network device establish a PPP session.

Step 409: The controller obtains a third load parameter of the first network device and a fourth load parameter of the second network device.

During specific implementation, the first network device sends a current load parameter of the first network device to the controller again by using the multipart response message and uses the current load parameter of the first network device as the third load parameter, and the second network device sends a current load parameter of the second network device to the controller again by using the multipart response message and uses the current load parameter of the second network device as the fourth load parameter.

Step 410: The controller determines, according to the third load parameter, that the first network device is not in the overloaded state, determines, according to the record of the overloaded device, that the first network device is recorded as the overloaded device, sends a delay cancel policy to the first network device, and deletes a record indicating that the first network device is the overloaded device.

Step 411: The first network device deletes configuration of the delay policy when receiving the delay cancel policy.

Step 412: The controller determines, according to the fourth load parameter, that the second network device is in the overloaded state, determines, according to the record of the overloaded device, that the second network device is not recorded as the overloaded device, sends the delay policy to the second network device, and records the second network device as the overloaded device.

Step 413: The second network device configures the received delay policy.

Step 414: The user equipment separately sends the PADI packet to the first network device and the second network device.

Step 415: When receiving the PADI packet, the first network device immediately returns the PADO packet to the user equipment.

Step 416: When receiving the PADI packet, the second network device returns the PADO packet to the user equipment after delaying for the period of time according to the configured delay policy.

Step 417: The user equipment first receives the PADO packet returned by the first network device, and then receives the PADO packet returned by the second network device, and the user equipment and the first network device establish a PPP session.

According to the technical solution of this embodiment, a controller delivers a delay policy to a network device. A network device with excessively heavy load delays returning a PADO packet for a PADI packet, and a network device with idle load immediately returns the PADO packet for the PADI packet. Therefore, user equipment can choose to establish a PPP session with the network device with idle load rather than the network device with excessively heavy load, thereby implementing load balance.

In a second example application scenario, the first configuration information is a blocking policy, the first state instructs the target network device to perform discard processing on the PADI packet, the second configuration information is a blocking cancel policy, and the second state instructs the target network device to immediately return the PADO packet for the PADI packet. The controller performs load balance control on a first network device and a second network device, and the user equipment initiates the PADI packet to both the first network device and the second network device when the user equipment needs to access the network.

Figure 5A:
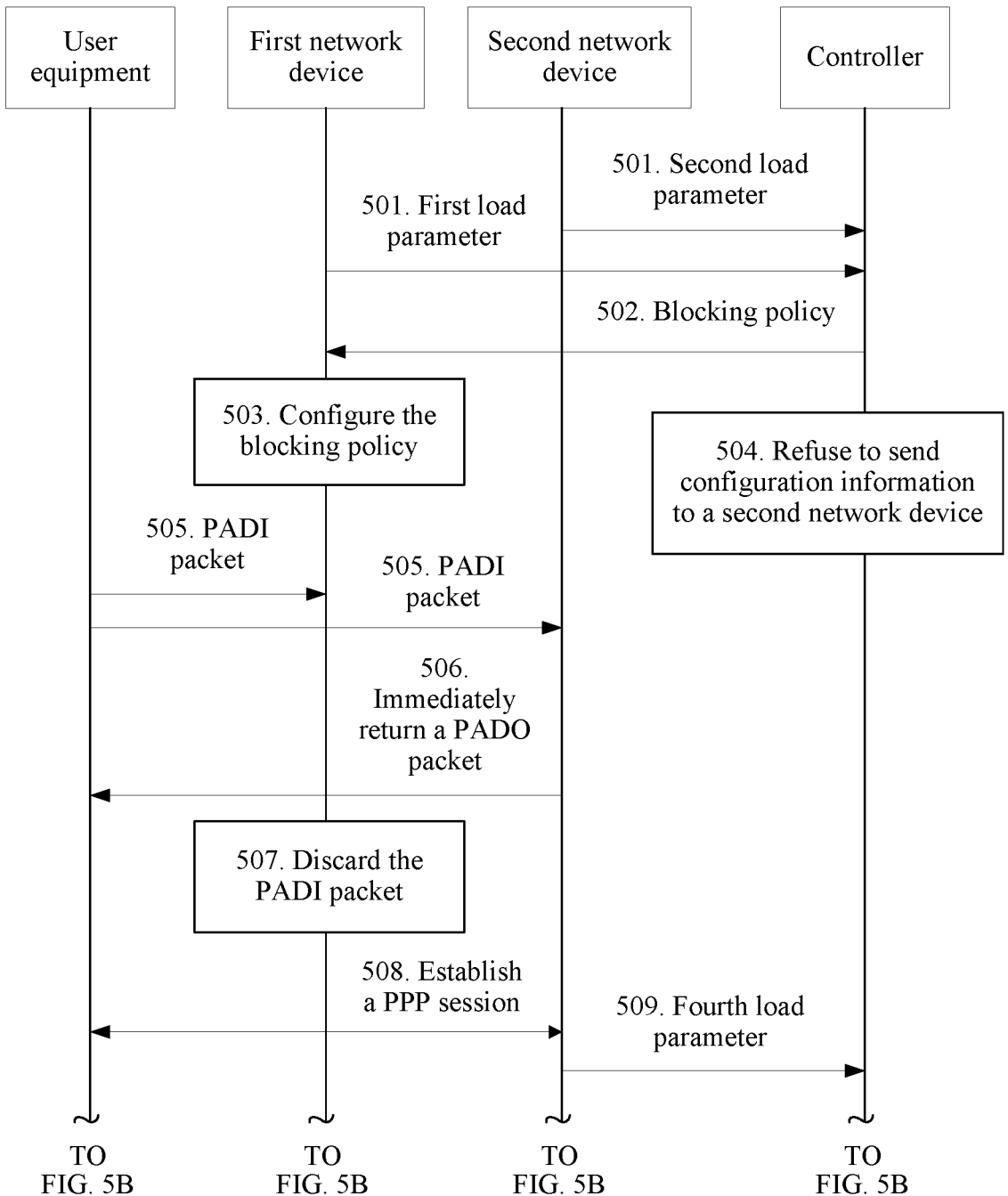
FIG. 5A and FIG. 5B are a flowchart of still another embodiment of a load sharing method according to the present application.
Figure 5B:
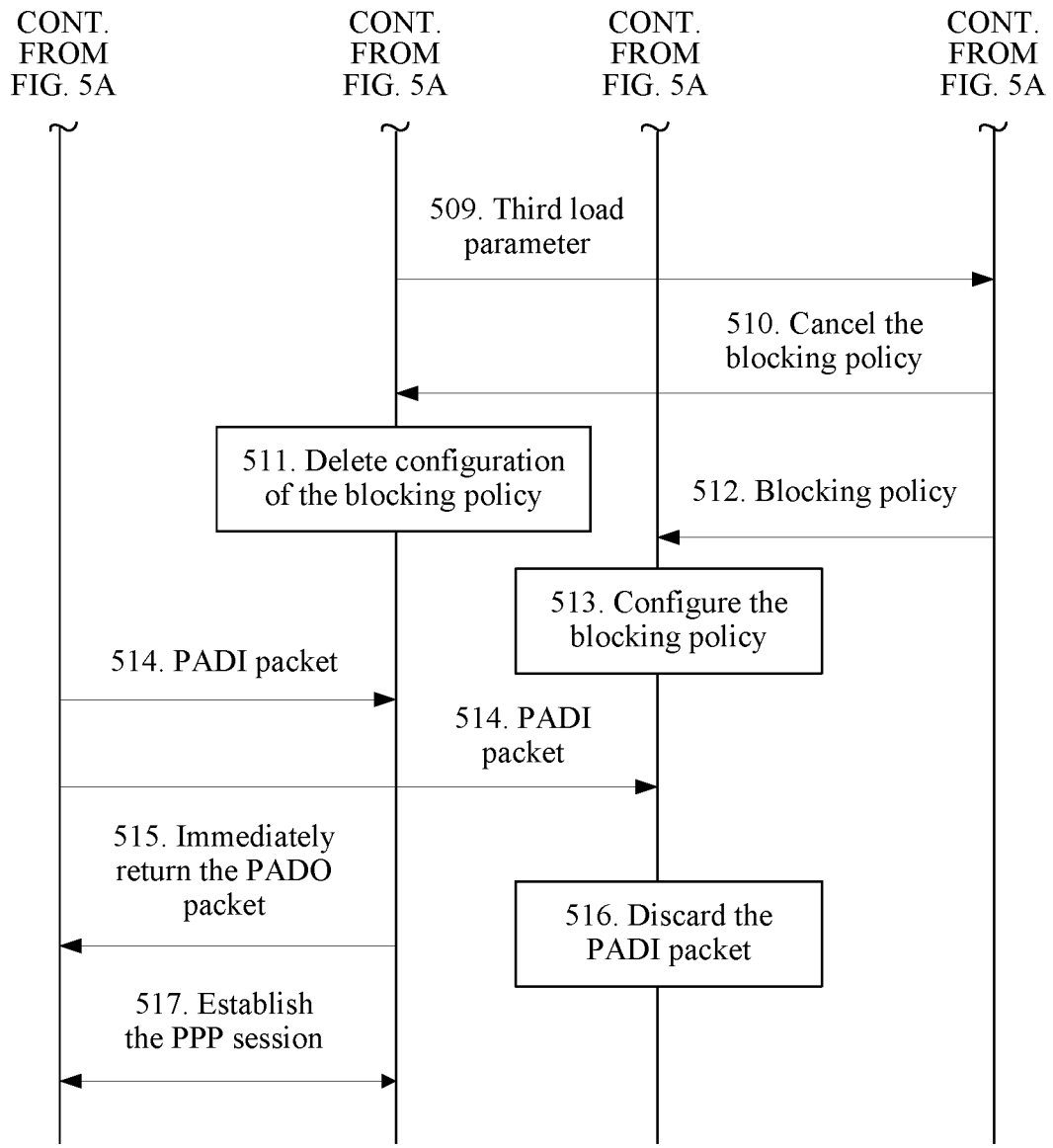

Referring to FIG. 5A and FIG. 5B, FIG. 5A and FIG. 5B are a flowchart of still another embodiment of a load sharing method according to an embodiment the present application. This embodiment may be applied to the foregoing second example application scenario, and the method includes the following steps.

Step 501: A controller obtains a first load parameter of a first network device and a second load parameter of a second network device.

During specific implementation, the first network device sends a current load parameter of the first network device to the controller by using a multipart response message and uses the current load parameter of the first network device as the first load parameter, and the second network device sends a current load parameter of the second network device to the controller by using the multipart response message and uses the current load parameter of the second network device as the second load parameter.

Step 502: The controller determines, according to the first load parameter, that the first network device is in an overloaded state, determines, according to a record of an overloaded device, that the first network device is not recorded as the overloaded device, sends a blocking policy to the first network device, and records the first network device as the overloaded device.

Step 503: The first network device configures the received blocking policy.

Step 504: The controller determines, according to the second load parameter, that the second network device is not in the overloaded state, determines, according to the record of the overloaded device, that the second network device is not recorded as the overloaded device, and refuses to send configuration information to the second network device.

Step 505: User equipment separately sends a PADI packet to the first network device and the second network device.

Step 506: When receiving the PADI packet, the second network device immediately returns a PADO packet to the user equipment.

Step 507: When receiving the PADI packet, the first network device discards the PADI packet according to the configured blocking policy.

That the first network device discards the PADI packet is that the first network device refuses to return a PADO packet to the user equipment.

Step 508: The user equipment receives the PADO packet returned by the second network device and does not receive the PADO packet returned by the first network device, and the user equipment and the second network device establish a PPP session.

Step 509: The controller obtains a third load parameter of the first network device and a fourth load parameter of the second network device.

During specific implementation, the first network device sends a current load parameter of the first network device to the controller again by using the multipart response message and uses the current load parameter of the first network device as the third load parameter, and the second network device sends a current load parameter of the second network device to the controller again by using the multipart response message and uses the current load parameter of the second network device as the fourth load parameter.

Step 510: The controller determines, according to the third load parameter, that the first network device is not in the overloaded state, determines, according to the record of the overloaded device, that the first network device is recorded as the overloaded device, sends a blocking cancel policy to the first network device, and deletes a record indicating that the first network device is the overloaded device.

Step 511: The first network device deletes configuration of the blocking policy when receiving the blocking cancel policy.

Step 512: The controller determines, according to the fourth load parameter, that the second network device is in the overloaded state, determines, according to the record of the overloaded device, that the second network device is not recorded as the overloaded device, sends the blocking policy to the second network device, and records the second network device as the overloaded device.

Step 513: The second network device configures the received blocking policy.

Step 513: The user equipment separately sends the PADI packet to the first network device and the second network device.

Step 514: When receiving the PADI packet, the first network device immediately returns the PADO packet to the user equipment.

Step 515: When receiving the PADI packet, the second network device discards the PADI packet according to the configured blocking policy.

That the second network device discards the PADI packet is that the second network device refuses to return the PADO packet to the user equipment.

Step 515: The user equipment receives the PADO packet returned by the first network device and does not receive the PADO packet returned by the second network device, and the user equipment and the first network device establish a PPP session.

According to the technical solution of this embodiment, a controller delivers a blocking policy to a network device. A network device with excessively heavy load discards processing on a PADI packet, and a network device with idle load immediately returns a PADO packet for the PADI packet. Therefore, user equipment can choose to establish a PPP session with the network device with idle load rather than the network device with excessively heavy load, thereby implementing load balance.

It should be noted that the foregoing two example application scenarios are merely two examples of this embodiment of the present application, and this embodiment of the present application is not limited to the two application scenarios.

Figure 6:
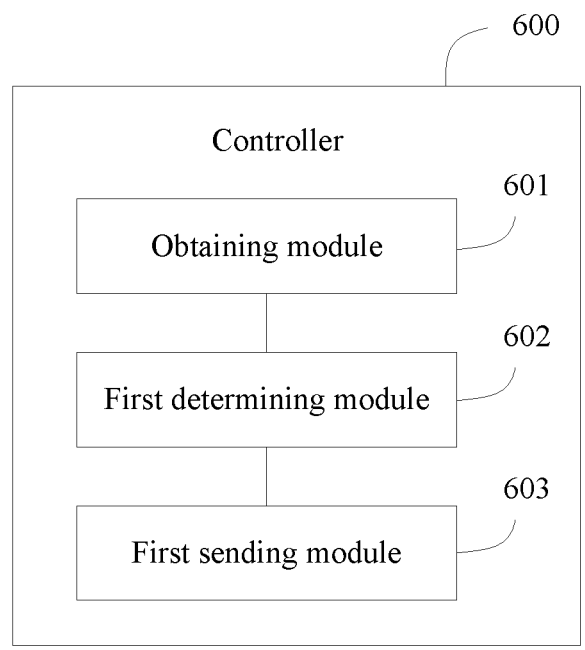
FIG. 6 is a schematic structural diagram of an embodiment of a load sharing apparatus according to the present application.

Referring to FIG. 6, FIG. 6 is a schematic structural diagram of an embodiment of a load sharing apparatus according to the present application. In this embodiment, the apparatus may be equipped in a controller 600. The apparatus includes:

an obtaining module 601, configured to obtain a load parameter of a target network device;

a first determining module 602, configured to determine, according to the load parameter, whether the target network device is in an overloaded state; and a first sending module 603, configured to send first configuration information to the target network device when the target network device is in the overloaded state, where the target network device is configured to be in a first state according to the first configuration information, and the first state instructs the target network device to delay or skip returning a PADO packet when receiving a PADI packet.

During specific implementation, in the controller 600, the obtaining module 601 obtains the load parameter of the target network device, the first determining module 602 determines, according to the load parameter obtained by the obtaining module 601, whether the target network device is in the overloaded state, and the first sending module 603 sends the first configuration information to the target network device when the first determining module 602 determines that the target network device is in the overloaded state.

In some embodiments, the obtaining module 601 may include a sending submodule and a receiving submodule. The sending submodule is configured to send a load parameter request to the target network device; and the receiving submodule is configured to receive the load parameter returned by the target network device for the load parameter request.

In some embodiments, the load parameter request may be an extended multipart Multipart request message of the Openflow Openflow protocol, and the load parameter may be sent by using an extended multipart response message of the Openflow protocol.

In some embodiments, the multipart request message may include a type Type field and a request body Body field, the type field carries a type value that indicates load balance information, and the request body field is empty or carries a device identifier; correspondingly, the multipart response message may include the type field and a response body Body field, and the response body field carries the load parameter of the target network device.

In some embodiments, the obtaining module 601 may be specifically configured to receive the load parameter actively sent by the target network device.

In some embodiments, the first determining module 602 may include a searching submodule, a calculation submodule, a first determining submodule, a second determining submodule, and a third determining submodule. The searching submodule is configured to search for a minimum value of load parameters of at least two network devices and use the minimum value as a minimum load value; the calculation submodule is configured to calculate a difference between the load parameter and the minimum load value and use the difference as a load difference; the first determining submodule is configured to determine whether the load difference exceeds a preset load threshold; the second determining submodule is configured to determine, when the load difference exceeds the load threshold, that the target network device is in the overloaded state; and the third determining submodule is configured to determine, when the load difference does not exceed the load threshold, that the target network device is not in the overloaded state. The at least two network devices include the target network device.

In some embodiments, the apparatus may further include a second sending module. The second sending module is configured to send second configuration information to the target network device when the target network device is not in the overloaded state, target network device is configured to be in a second state using the second configuration information, and the second state instructs the target network device to immediately return the PADO packet when receiving the PADI packet.

In some embodiments, the apparatus may further include a recording module and a deletion module. The recording module is configured to record the target network device as an overloaded device after the first configuration information is sent to the target network device; and the deletion module is configured to delete, after the second configuration information is sent to the target network device, a record indicating that the target network device is the overloaded device.

In some embodiments, the apparatus may further include a second determining module. The second determining module is configured to determine whether the target network device is the recorded overloaded device; the first sending module 603 is specifically configured to send the first configuration information to the target network device when the target network device is in the overloaded state and the target network device is not the recorded overloaded device; and the second sending module is specifically configured to send the second configuration information to the target network device when the target network device is not in the overloaded state and the target network device is the recorded overloaded device.

In some embodiments, the load parameter may include a user proportion, bandwidth utilization, CPU utilization, or a remaining CPU processing capability of the target network device.

In some embodiments, the target network device may be a BNG

It should be noted that the controller 600 in this embodiment is corresponding to the controller mentioned in the embodiment shown in FIG. 2. For various specific implementations of the apparatus equipped in the controller 600 in this embodiment, refer to detailed descriptions of the embodiment shown in FIG. 2, and details are not described in this embodiment again.

According to the technical solution of this embodiment, the controller 600 delivers the first configuration information to a network device with excessively heavy load, and the network device with excessively heavy load is configured to be in the first state. When the PADI packet sent by user equipment is received, after the network device with excessively heavy load is configured by the controller, the network device with excessively heavy load delays returning or refuses to return the PADO packet to the user equipment, instead of immediately returning the PADO packet to the user equipment. Therefore, the user equipment can select a network device with idle load to access a network and can avoid selecting the network device with excessively heavy load to access the network. In this way, load of network devices in the network is more balanced.

Figure 7:
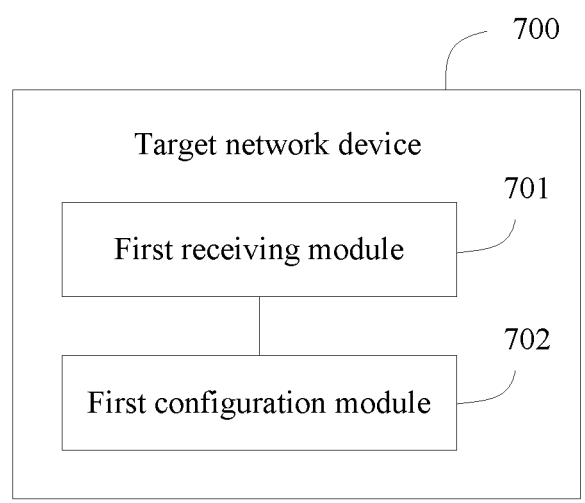
FIG. 7 is a schematic structural diagram of another embodiment of a load sharing apparatus according to the present application.

Referring to FIG. 7, FIG. 7 is a schematic structural diagram of another embodiment of a load sharing apparatus according to the present application. In this embodiment, the apparatus may be equipped in a target network device 700, and the target network device may be any network device under control of a controller. The apparatus includes:

a first receiving module 701, configured to receive first configuration information sent by the controller; and a first configuration module 702, configured to configure a first state according to the first configuration information, where the first state instructs the target network device to delay or skip returning a PADO packet when receiving a PADI packet; and the first configuration information is sent by the controller to the target network device when the controller determines, according to a load parameter of the target network device, that the target network device is in an overloaded state.

During specific implementation, in the target network device 700, the first receiving module 701 receives the first configuration information sent by the controller, and the first configuration module 702 configures the first state according to the first configuration information received by the first receiving module 701. According to an instruction of the first state, the target network device 700 delays returning or refuses to return the PADO packet when receiving the PADI packet.

In some embodiments, the apparatus may further include a second receiving module and a returning control module. The second receiving module is configured to receive the PADI packet sent by a host; and the returning control module is configured to delay or skip returning the PADO packet to the host when the returning control module is in the first state.

In some embodiments, the apparatus may further include a third receiving module and a returning module. The third receiving module is configured to receive a load parameter request sent by the controller; and the returning module is configured to return the load parameter to the controller.

In some embodiments, the load parameter request may be an extended multipart request message of the Openflow protocol, and the load parameter is sent by using an extended multipart response message of the Openflow protocol.

In some embodiments, the multipart request message may include a type Type field and a request body Body field, the type field carries a type value that indicates load balance information, and the request body field is empty or carries a device identifier; correspondingly, the multipart response message may include the type field and a response body Body field, and the response body field carries the load parameter of the target network device.

In some embodiments, the apparatus may further include a sending module. The sending module is configured to actively send the load parameter to the controller.

In some embodiments, the apparatus may further include a fourth receiving module and a second configuration module. The fourth receiving module is configured to receive second configuration information sent by the controller; and the second configuration module is configured to configure a second state according to the second configuration information. The second state instructs the target network device to immediately return the PADO packet when receiving the PADI packet; and the second configuration information is sent by the controller to the target network device when the controller determines, according to the load parameter of the target network device, that the target network device is not in the overloaded state.

It should be noted that the target network device 700 in this embodiment is corresponding to the target network device mentioned in the embodiment shown in FIG. 2. For various specific implementations of the apparatus equipped in the target network device 700 in this embodiment, refer to detailed descriptions of the embodiment shown in FIG. 2, and details are not described in this embodiment again.

According to the technical solution of this embodiment, the target network device 700 receives, when load is excessively heavy, the first configuration information delivered by the controller, and a network device with excessively heavy load is configured to be in the first state. When the PADI packet sent by user equipment is received, after the network device with excessively heavy load is configured by the controller, the network device with excessively heavy load delays returning or refuses to return the PADO packet to the user equipment, instead of immediately returning the PADO packet to the user equipment. Therefore, the user equipment can select a network device with idle load to access a network and can avoid selecting the network device with excessively heavy load to access the network. In this way, load of network devices in the network is more balanced.

Figure 8:
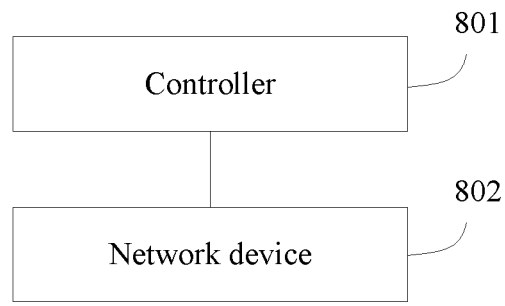
FIG. 8 is a schematic structural diagram of an embodiment of a load sharing system according to the present application.

Referring to FIG. 8, FIG. 8 is a schematic structural diagram of an embodiment of a load sharing system according to the present application. In this embodiment, the system includes a controller 801 and a network device 802, the controller 801 is equipped with the apparatus of any implementation in the embodiment shown in FIG. 6, and the network device 802 is equipped with the apparatus of any implementation in the embodiment shown in FIG. 7.

It should be noted that the controller 801 in this embodiment is corresponding to the controller mentioned in the embodiment shown in FIG. 2, and the network device 802 in this embodiment is corresponding to the target network device mentioned in the embodiment shown in FIG. 2. For various specific implementations of the controller 801 and the network device 802 in this embodiment, refer to detailed descriptions of the embodiment shown in FIG. 2, and details are not described in this embodiment again.

According to the technical solution of this embodiment, a controller configures a network device with excessively heavy load to be in a first state. When PADI packet sent by user equipment is received, after the network device with excessively heavy load is configured by the controller, the network device with excessively heavy load delays returning or refuses to return a PADO packet to the user equipment, instead of immediately returning the PADO packet to the user equipment. Therefore, the user equipment can select a network device with idle load to access a network and can avoid selecting the network device with excessively heavy load to access the network. In this way, load of network devices in the network is more balanced.

In addition, for load balance between the network devices in the network, a switching device that is configured to control a packet forwarding path does not need to be additionally added between the user equipment and the network device, so that a network architecture does not need to be transformed, and a packet forwarding path control command does not need to be preconfigured on the user equipment, so that a large quantity of user equipments do not need to be transformed. It can be learned that a difficulty in implementing network load balance is small and costs are low so that the network load balance is more easily implemented.

Figure 9:
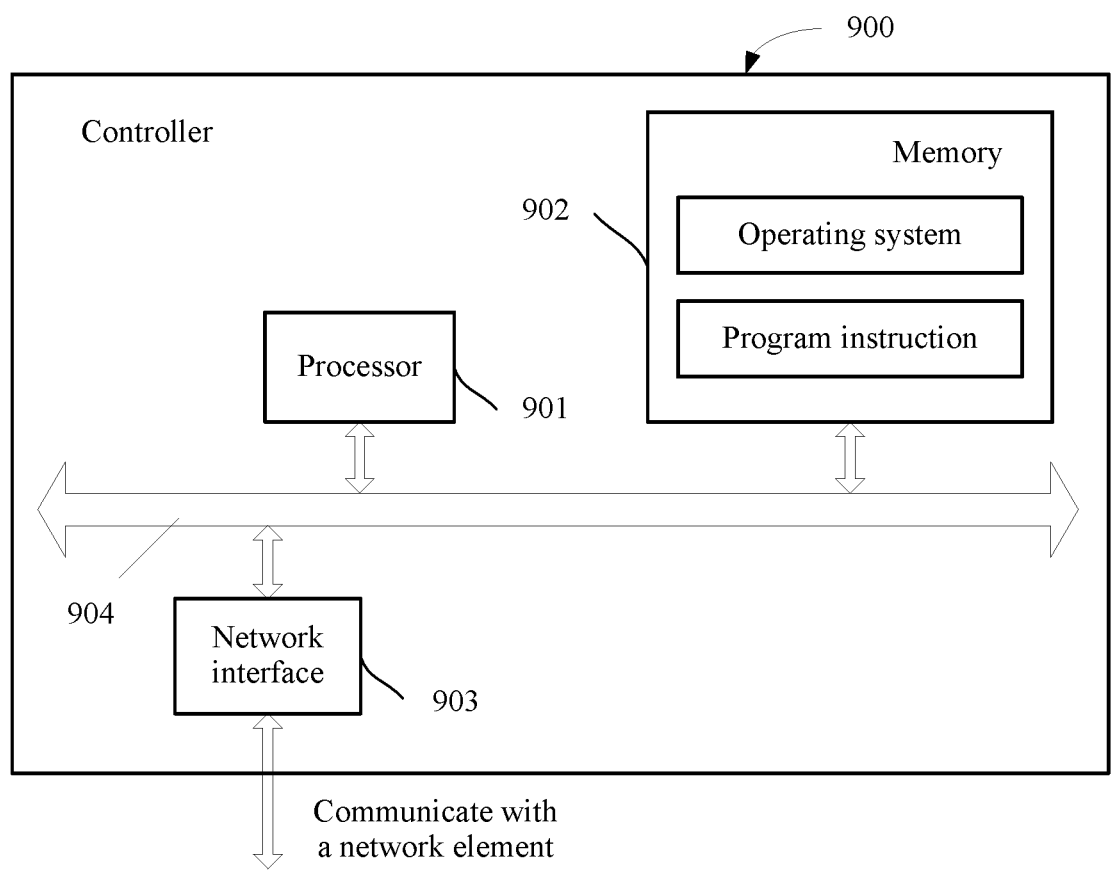
FIG. 9 is a schematic structural diagram of a controller according to an embodiment of the present application.

Referring to FIG. 9, FIG. 9 is a schematic structural diagram of a controller according to an embodiment of the present application. In this embodiment, a controller 900 includes a processor 901, a memory 902, a network interface 903, and a bus system 904.

The bus system 904 is configured to couple hardware components of the controller 900 together.

The network interface 903 is configured to implement a communication connection between the controller 900 and at least one other network element, and a manner of the Internet, a wide area network, a local area network, a metropolitan area network, or the like may be used.

The memory 902 is configured to store a program instruction and data.

The processor 901 is configured to read the instruction and the data that are stored in the memory 902, so as to perform the following operations:

the processor 901 obtains a load parameter of a target network device;

the processor 901 determines, according to the load parameter, whether the target network device is in an overloaded state; and the processor 901 sends first configuration information to the target network device when the target network device is in the overloaded state.

The target network device is configured to be in a first state according to the first configuration information, and the first state instructs the target network device to delay or skip returning a PADO packet when receiving a PADI packet.

In some embodiments, to obtain the load parameter of the target network device, the processor 901 may perform the following operations:

the processor 901 sends a load parameter request to the target network device; and the processor 901 receives the load parameter returned by the target network device for the load parameter request.

In some embodiments, the load parameter request may be an extended multipart Multipart request message of the Openflow Openflow protocol, and the load parameter may be sent by using an extended multipart response message of the Openflow protocol.

In some embodiments, the multipart request message may include a type Type field and a request body Body field, the type field carries a type value that indicates load balance information, and the request body field is empty or carries a device identifier; correspondingly, the multipart response message may include the type field and a response body Body field, and the response body field carries the load parameter of the target network device.

In some embodiments, to obtain the load parameter of the target network device, the processor 901 may perform the following operation:

the processor 901 receives the load parameter actively sent by the target network device.

In some embodiments, to determine, according to the load parameter, whether the target network device is in the overloaded state, the processor 901 may perform the following operations:

the processor 901 searches for a minimum value of load parameters of at least two network devices and uses the minimum value as a minimum load value, where the at least two network devices include the target network device;

the processor 901 calculates a difference between the load parameter and the minimum load value and uses the difference as a load difference;

the processor 901 determines whether the load difference exceeds a preset load threshold;

the processor 901 determines, when the load difference exceeds the load threshold, that the target network device is in the overloaded state; and the processor 901 determines, when the load difference does not exceed the load threshold, that the target network device is not in the overloaded state.

In some embodiments, the processor 901 may further perform the following operation:

the processor 901 sends second configuration information to the target network device when the target network device is not in the overloaded state.

Target network device is configured to be in a second state using the second configuration information, and the second state instructs the target network device to immediately return the PADO packet when receiving the PADI packet.

In some embodiments, the processor 901 may further perform the following operations:

the processor 901 records the target network device as an overloaded device after sending the first configuration information to the target network device; and the processor 901 deletes, after sending the second configuration information to the target network device, a record indicating that the target network device is the overloaded device.

In some embodiments, the processor 901 may further perform the following operations:

the processor 901 determines whether the target network device is the recorded overloaded device;

to send the first configuration information to the target network device when the target network device is in the overloaded state, the processor 901 specifically performs the following operation: the processor 901 sends the first configuration information to the target network device when the target network device is in the overloaded state and the target network device is not the recorded overloaded device; and to send the second configuration information to the target network device when the target network device is not in the overloaded state, the processor specifically performs the following operation: the processor 901 sends the second configuration information to the target network device when the target network device is not in the overloaded state and the target network device is the recorded overloaded device.

In some embodiments, the load parameter may include a user proportion, bandwidth utilization, CPU utilization, or a remaining CPU processing capability of the target network device.

In some embodiments, the target network device may be a BNG

It should be noted that the controller 900 in this embodiment is corresponding to the controller in the embodiment shown in FIG. 2. For various specific implementations of the controller 900 in this embodiment, refer to detailed descriptions of the embodiment shown in FIG. 2, and details are not described in this embodiment again.

Figure 10:
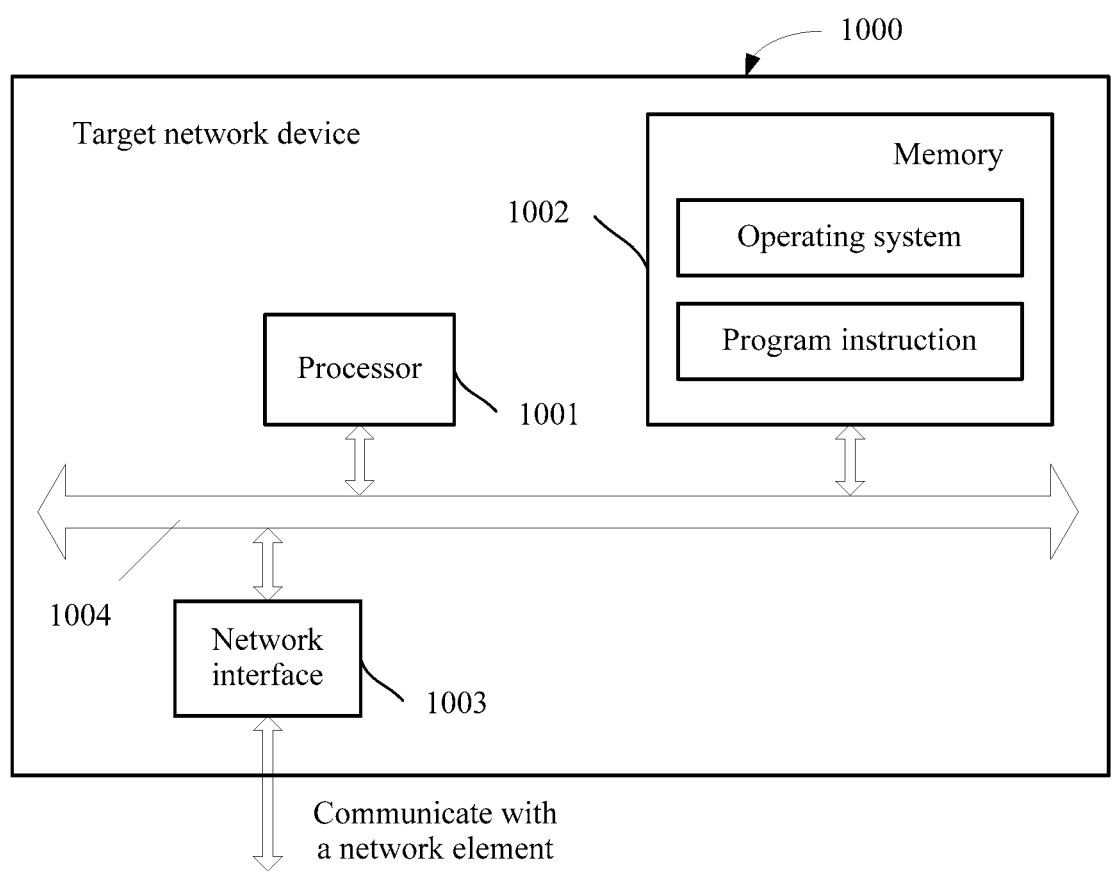
FIG. 10 is a schematic structural diagram of a target network device according to an embodiment of the present application.

Referring to FIG. 10, FIG. 10 is a schematic structural diagram of a target network device according to an embodiment of the present application. In this embodiment, a target network device 1000 includes a processor 1001, a memory 1002, a network interface 1003, and a bus system 1004.

The bus system 1004 is configured to couple hardware components of the target network device 1000 together.

The network interface 1003 is configured to implement a communication connection between the target network device 1000 and at least one other network element, and a manner of the Internet, a wide area network, a local area network, a metropolitan area network, or the like may be used.

The memory 1002 is configured to store a program instruction and data.

The processor 1001 is configured to read the instruction and the data that are stored in the memory 1002, so as to perform the following operations:

the processor 1001 receives first configuration information sent by a controller; and the processor 1001 configures a first state according to the first configuration information.

The first state instructs the target network device to delay or skip returning a PADO packet when receiving a PADI packet.

The first configuration information is sent by the controller to the target network device when the controller determines, according to a load parameter of the target network device, that the target network device is in an overloaded state.

In some embodiments, the processor 1001 may further perform the following operations:

the processor 1001 receives the PADI packet sent by user equipment; and the processor 1001 delays or skips returning the PADO packet to the user equipment when the processor 1001 is in the first state.

In some embodiments, the processor 1001 may further perform the following operations:

the processor 1001 receives a load parameter request sent by the controller; and the processor 1001 returns the load parameter to the controller.

In some embodiments, the load parameter request may be an extended multipart request message of the Openflow protocol, and the load parameter is sent by using an extended multipart response message of the Openflow protocol.

In some embodiments, the multipart request message may include a type Type field and a request body Body field, the type field carries a type value that indicates load balance information, and the request body field is empty or carries a device identifier; correspondingly, the multipart response message may include the type field and a response body Body field, and the response body field carries the load parameter of the target network device.

In some embodiments, the processor 1001 may further perform the following operation:

the processor 1001 actively sends the load parameter to the controller.

In some embodiments, the processor 1001 may further perform the following operations:

the processor 1001 receives second configuration information sent by the controller; and the processor 1001 configures a second state according to the second configuration information.

The second state instructs the target network device to immediately return the PADO packet when receiving the PADI packet.

The second configuration information is sent by the controller to the target network device when the controller determines, according to the load parameter of the target network device, that the target network device is not in the overloaded state.

It should be noted that the target network device 1000 in this embodiment is corresponding to the target network device in the embodiment shown in FIG. 2. For various specific implementations of the target network device 1000 in this embodiment, refer to detailed descriptions of the embodiment shown in FIG. 2, and details are not described in this embodiment again.

The word "first" in a name such as "first configuration information" or a "first sending module" mentioned in the embodiments of the present application is merely used as a name identifier, and does not mean being the first in a sequence. This rule is also applicable to the word "second", "third", and "fourth".

It should be noted that the processor in the embodiments of the present application may be an integrated circuit chip and has a signal processing capability. In an implementation process, each step of the foregoing methods may be completed by using an integrated logic circuit of hardware in the processor or an instruction in a form of software. These instructions may be implemented and controlled by cooperation of the processor, and are used to execute the methods disclosed in the embodiments of the present application. The processor may also be a general purpose processor, a digital signal processor (DSP for short), an application-specific integrated circuit, a field programmable gate array (FPGA for short), or another programmable logical device, discrete gate or transistor logical device, or discrete hardware component.

The general purpose processor may be a microprocessor or the processor may be any conventional processor, decoder, or the like. The steps of the method disclosed with reference to the embodiments of the present application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like.

In addition, it should be noted that, in addition to including a data bus, the bus system may further include a power bus, a control bus, a status signal bus, and the like. However, for clear description, various types of buses in FIG. 9 and FIG. 10 are marked as the bus system.

From the foregoing descriptions of the implementations, a person skilled in the art may clearly understand that some or all steps of the methods in the embodiments may be implemented by software in addition to a universal hardware platform. Based on such an understanding, the technical solutions of the present application essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device such as media gateway) to perform the methods described in the embodiments or some parts of the embodiments of the present application.

It should be noted that the embodiments in this specification are all described in a progressive manner, for same or similar parts in the embodiments, reference may be made to these embodiments, and each embodiment focuses on a difference from other embodiments. Especially, method and device embodiments are basically similar to a system embodiment, and therefore are described briefly. For related parts, refer to partial descriptions in the system embodiment. The described device and system embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present application without creative efforts.

The foregoing descriptions are merely example embodiments of the present application, but are not intended to limit the protection scope of the present application. It should be noted that a person of ordinary skill in the art may make certain improvements or modifications without departing from the principle of the present application and the improvements or modifications shall fall within the protection scope of the present disclosure.

What is claimed is:

1. A load sharing method, wherein the method comprises:
obtaining, by a controller, a load parameter of a target network device;
determining, by the controller based at least in part on the load parameter, whether the target network device is in an overloaded state; and
sending, by the controller, first configuration information to the target network device when the target network device is in the overloaded state, wherein:
the target network device is configured to be in a first state according to the first configuration information, first state instructing the target network device to block returning a PPPoE Active Discovery Offer Initiation (PADO) packet by discarding a PPPoE Active Discovery Initiation (PADI) packet when the PADI is received by the target network device.

2. The method according to claim 1, wherein obtaining, by the controller, the load parameter of a target network device comprises:
sending, by the controller, a load parameter request to the target network device; and
receiving, by the controller, the load parameter of the target network device.

3. The method according to claim 1, wherein obtaining, by the controller, the load parameter of a target network device comprises:
receiving, from the target network device, the load parameter.

4. The method according to claim 1, wherein determining, by the controller based at least in part on the load parameter, whether the target network device is in the overloaded state comprises:
searching for, by the controller, a minimum value of load parameters of at least two network devices and the minimum value being a minimum load value, wherein the target network device is at least one of the two network devices;
calculating, by the controller, a difference between the load parameter and the minimum load value and the difference being a load difference;
determining, by the controller, whether the load difference exceeds a preset load threshold;
determining, by the controller when the load difference exceeds the load threshold, that the target network device is in the overloaded state; and
determining, by the controller when the load difference does not exceed the load threshold, that the target network device is not in the overloaded state.

5. The method according to claim 1, further comprising:
sending, by the controller, second configuration information to the target network device when the target network device is not in the overloaded state, wherein:
the target network device is configured to be in a second state according to the second configuration information, the second state instructing the target network device to return the PADO packet when receiving the PADI packet.

6. The method according to claim 5, further comprising:
recording, by the controller after sending the first configuration information to the target network device, the target network device as an overloaded device; and
deleting, by the controller after sending the second configuration information to the target network device, a record indicating that the target network device is the overloaded device.

7. The method according to claim 6, further comprising:
sending, by the controller, the first configuration information to the target network device when the target network device is in the overloaded state and the target network device is not the recorded overloaded device; and
sending, by the controller, the second configuration information to the target network device when the target network device is not in the overloaded state and the target network device is the recorded overloaded device.

8. The method according to claim 1, wherein the load parameter comprises at least one of a user proportion, bandwidth utilization, CPU utilization, or a remaining CPU processing capability of the target network device.

9. A load sharing method, wherein the method comprises:
receiving, by a target network device, first configuration information sent by a controller; and
configuring, by the target network device, a first state according to the first configuration information, wherein:
the first state instructs the target network device to block returning a PPPoE Active Discovery Offer initiation (PADO) packet by discarding a PPPoE Active Discovery Initiation (PADI) packet when the PADI is received by the target network device; and
the first configuration information is sent by the controller according to a load parameter of the target network device, that the target network device is in an overloaded state.

10. The method according to claim 9, further comprising:
receiving, by the target network device, the PADI packet sent by user equipment; and
discarding, by the target network device, the PADI when the target network device is in the first state.

11. The method according to claim 9, further comprising:
receiving, by the target network device, a load parameter request sent by the controller; and
returning, by the target network device, the load parameter to the controller.

12. The method according to claim 9, further comprising:
sending, by the target network device, the load parameter to the controller.

13. The method according to claim 9, further comprising:
receiving, by the target network device, second configuration information sent by the controller; and
configuring, by the target network device, a second state according to the second configuration information, wherein:
the second state instructs the target network device to return the PADO packet when receiving the PADI packet; and
the second configuration information is sent by the controller to the target network device when, according to the load parameter of the target network device, that the target network device is not in the overloaded state.

14. A load sharing apparatus, comprising:
a non-transitory memory storing instructions; and
a processor coupled to the non-transitory memory; wherein the instructions, when executed by the processor, cause the apparatus to be configured to:
obtain a load parameter of a target network device;
determine, based at least in part on the load parameter, whether the target network device is in an overloaded state; and send first configuration information to the target network device when the target network device is in the overloaded state, wherein:
the target network device is configured to be in a first state according to the first configuration information, the first state instructing the target network device to block returning a PPPoE Active Discovery Offer Initiation (PADO) packet by discarding a PPPoE Active Discovery Initiation (PADI) packet when received.

15. The apparatus according to claim 14, wherein the instructions, when executed by the processor, further cause the apparatus to be configured to:
send a load parameter request to the target network device; and
receive the load parameter returned by the target network device for the load parameter request.

16. The apparatus according to claim 14, wherein the instructions, when executed by the processor, further cause the apparatus to be configured to receive the load parameter sent by the target network device.

17. The apparatus according to claim 14, wherein the instructions, when executed by the processor, further cause the apparatus to be configured to:
search for a minimum value of load parameters of at least two network devices and the minimum value being a minimum load value, wherein the target network device is at least one of the two network devices;
calculate a difference between the load parameter and the minimum load value and the difference being a load difference;
determine whether the load difference exceeds a preset load threshold;
determine, when the load difference exceeds the load threshold, that the target network device is in the overloaded state; and
determine, when the load difference does not exceed the load threshold, that the target network device is not in the overloaded state.

18. The apparatus according to claim 14, wherein the instructions, when executed by the processor, further cause the apparatus to be configured to:
send second configuration information to the target network device when the target network device is not in the overloaded state, wherein:
the target network device is configured to be in a second state according to the second configuration information, and the second state instructs the target network device to immediately the PADO packet when receiving the PADI packet.

19. The apparatus according to claim 18, wherein the instructions, when executed by the processor, further cause the apparatus to be configured to:
record the target network device as an overloaded device after the first configuration information is sent to the target network device; and
delete, after the second configuration information is sent to the target network device, a record indicating that the target network device is the overloaded device.

20. The apparatus according to claim 19, wherein the instructions, when executed by the processor, further cause the apparatus to be configured to:
determine whether the target network device is the recorded overloaded device;
send the first configuration information to the target network device when the target network device is in the overloaded state and the target network device is not the recorded overloaded device; and
send the second configuration information to the target network device when the target network device is not in the overloaded state and the target network device is the recorded overloaded device.

* * * * *